(12) United States Patent
Fujita et al.

(10) Patent No.: US 7,893,575 B2
(45) Date of Patent: Feb. 22, 2011

(54) ROTOR WITH FIELD COILS IN OPTIMIZED FLUX SPACE SLOTS

(75) Inventors: Masafumi Fujita, Yokohama (JP); Tadashi Tokumasu, Tokyo (JP); Yasuo Kabata, Yokohama (JP); Mikio Kakiuchi, Yokohama (JP); Masanori Arata, Yokohama (JP); Takashi Ueda, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 227 days.

(21) Appl. No.: 12/127,120

(22) Filed: May 27, 2008

(65) Prior Publication Data

US 2008/0296989 A1 Dec. 4, 2008

(30) Foreign Application Priority Data

May 28, 2007 (JP) ............................. 2007-140342

(51) Int. Cl.
*H02K 1/26* (2006.01)
*H02K 9/00* (2006.01)

(52) U.S. Cl. ................... 310/61; 310/52; 310/216.071; 310/216.072; 310/216.073; 310/216.099

(58) Field of Classification Search ................ 310/214, 310/216.099, 216.071–216.073, 52, 61; *H02K 1/26*
See application file for complete search history.

(56) References Cited

U.S. PATENT DOCUMENTS 4,363,986 A * 12/1982 Joho et al. .................. 310/214
4,900,964 A * 2/1990 Ying et al. .................. 310/215
5,469,009 A * 11/1995 Wakui et al. ............. 310/261.1
6,989,621 B2 * 1/2006 Kaminski et al. ........ 310/261.1
7,365,469 B2 * 4/2008 Wiker et al. .......... 310/216.004
2002/0121830 A1* 9/2002 Tong et al. .................. 310/214
2006/0214531 A1* 9/2006 Wiker et al. ................ 310/216

FOREIGN PATENT DOCUMENTS

| JP | 56157234 | * 12/1981 |
| JP | 0767279 | * 3/1995 |
| JP | 11206045 | * 7/1999 |
| JP | 2007116801 | * 5/2007 |

* cited by examiner

*Primary Examiner*—Karl I Tamai
*Assistant Examiner*—Terrance Kenerly
(74) *Attorney, Agent, or Firm*—Foley & Lardner LLP

(57) ABSTRACT

The depth from the open end of a rotor slot closest to a magnetic pole of a rotary core to a slot bottom or the bottom of a subslot provided as a coolant ventilation path on a rotor slot bottom is made less than the depth of slots at and after a second slot counted from the magnetic pole side in the direction of internal circumference, and when a shortest distance between the bottoms of the rotor slots opposed to each other through a magnetic pole or a shortest distance between the bottoms of the subslots is assumed to be a magnetic pole width of the slots, a magnetic pole width Wp1 of a slot closest to the magnetic pole side is set to 85% or more of a magnetic pole width Wp2 of a second slot counted from the magnetic pole side in the direction of internal circumference.

18 Claims, 15 Drawing Sheets

ROTOR WITH FIELD COILS IN OPTIMIZED FLUX SPACE SLOTS

CROSS-REFERENCE TO RELATED APPLICATIONS

This application is based upon and claims the benefit of priority from prior Japanese Patent Application No. 2007-140342, filed May 28, 2007, the entire contents of which are incorporated herein by reference.

BACKGROUND OF THE INVENTION

1. Field of the Invention

The present invention relates to a rotor of a rotary electric machine, wherein a magnetic pole part and a inter-pole part are formed, and a plurality of rotor slot for inserting field coils into a inter-pole part are provided in the direction of internal circumference.

2. Description of the Related Art

A conventional rotor of an electric rotary machine, for example, a turbine generator is configured as shown in FIG. 14.

In a rotor of a turbine generator, a rotor core 1 is made of a single massive lump of steel to provide a mechanical strength, and a magnetic pole part 6 and a inter-pole part 6A are formed as shown in the drawing. In the inter-pole part 6A, a plurality of rotor slot 2 for inserting a winding is provided at regular intervals in the direction of the internal circumference of the rotor core 1, and teeth 11 are formed between the slots. A field coil 3 is housed in each rotor slot 2.

FIG. 15 is a sectional view of the outside diameter part of the rotor slot 2, showing the basic configuration of the field coil 3 inserted into the rotor slot.

As shown in the drawing, in the field coil 3, a plurality of field coil conductor 10 is stacked in the radial direction, and a slot insulator 8 is provided between the field coil conductor 10 and the inside surface of the rotor slot 2, an insulation block 7 is provided between the field coil conductor 10 and a rotor wedge 4 provided at the open end of the rotor slot 2, thereby ensuring insulation among the field coil conductor 10, the rotor core 1 becoming an earth potential, and the rotor wedge 4.

Between the rotor wedge 4 and insulation block 7, a slot dumper 9 may be provided to decrease an eddy current loss caused by a harmonic magnetic field generated in a not-shown stator.

Further, a subslot 5 serving as a ventilation path in the axial direction is provided at the bottom of the rotor slot 2, in being communicated to the bottom of the slot, a not-shown hole is provided as a ventilation path in the radial direction of the field coil 3 and rotor wedge 4, and the heat generated by Joule heating in the field coil 3 is cooled by a coolant supplied from the subslot 5.

As an example of a rotor of such a rotary electric machine, the shape, structure and arrangement of a slot are changed to decrease a voltage fluctuation rate, thereby improving stability (e.g., Jpn. Pat. Appln. KOKAI Publication No. 11-89132, and Japanese Patent No. 3303674).

To improve the efficiency of a rotary electric machine, it is necessary to decrease a field winding copper loss as one of the loss generated by a rotary electric machine. To increase the capacity of a rotary electric machine, it is necessary to increase a magnetic flux of a field magnetic by increasing a field magnetomotive force.

In contrast, when a field magnetomotive force is increased, a field coil is heated much more, and the efficiency of cooling the field coil needs to be increased as the field magnetomotive force is increased. In this case, also, the total cross section of a field coil conductor forming a field coil must be increased to decrease a field winding copper loss.

However, as the dimensions of a rotor slot are limited by the strength of a rotor, the cross section of a rotor slot cannot be increased, and a field magnetomotive force cannot be increased.

BRIEF SUMMARY OF THE INVENTION

The present invention has been made in view of the above circumstances. Accordingly, it is an object of the invention to provide a high-efficiency large-capacity rotor of a rotary electric machine, by improving the structure of a rotor slot of a magnetic pole, increasing the area of a field coil conductor in a radial cross section of a rotary core to increase an occupation rate of a field coil conductor, and increasing a total cross section of a field coil conductor to decrease a field winding copper loss.

The invention comprises a magnetic pole, and rotor slots for inserting a winding formed in a part other than the magnetic pole part.

The invention comprises a magnetic pole, rotor slots for inserting a winding formed in a part other than the magnetic pole part, and a subslot provided as a coolant ventilation path at the bottom of the rotor slot.

The invention comprises a rotor core, which has a magnetic pole, rotor slots for inserting a winding formed in a part other than the magnetic pole part, a subslot provided as a coolant ventilation path at the bottom of a rotor slot other than a rotor slot closest to the magnetic pole part, and teeth formed between a subslot and a rotor slot, wherein the depth from the open end of a rotor slot closest to the magnetic pole to a slot bottom is made less than the depth of slots at and after a second slot counted from the magnetic pole side in the direction of internal circumference, and when a shortest distance between the bottoms of the rotor slots opposed to each other through the magnetic pole is assumed to be a magnetic pole width of the slots, a magnetic pole width Wp1 of a slot closest to the magnetic pole is set to 85% or more of a magnetic pole width Wp2 of a second slot counted from the magnetic pole side in the direction of internal circumference;

a field coil composed of field coil conductors inserted into the rotor slot; and a rotor wedge which is inserted into the opening of the rotor slot, and holds the field coil.

According to the invention, there is provided a high-efficiency large-capacity rotor of a rotary electric machine, by improving the structure of a rotor slot of a magnetic pole, increasing the area of a field coil conductor in a radial cross section of a rotary core to increase an occupation rate of a field coil conductor, and increasing a total cross section of a field coil conductor to decrease a field winding copper loss.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the invention will be explained hereinafter with reference to the accompanying drawings.

Embodiment 1

Figure 1:
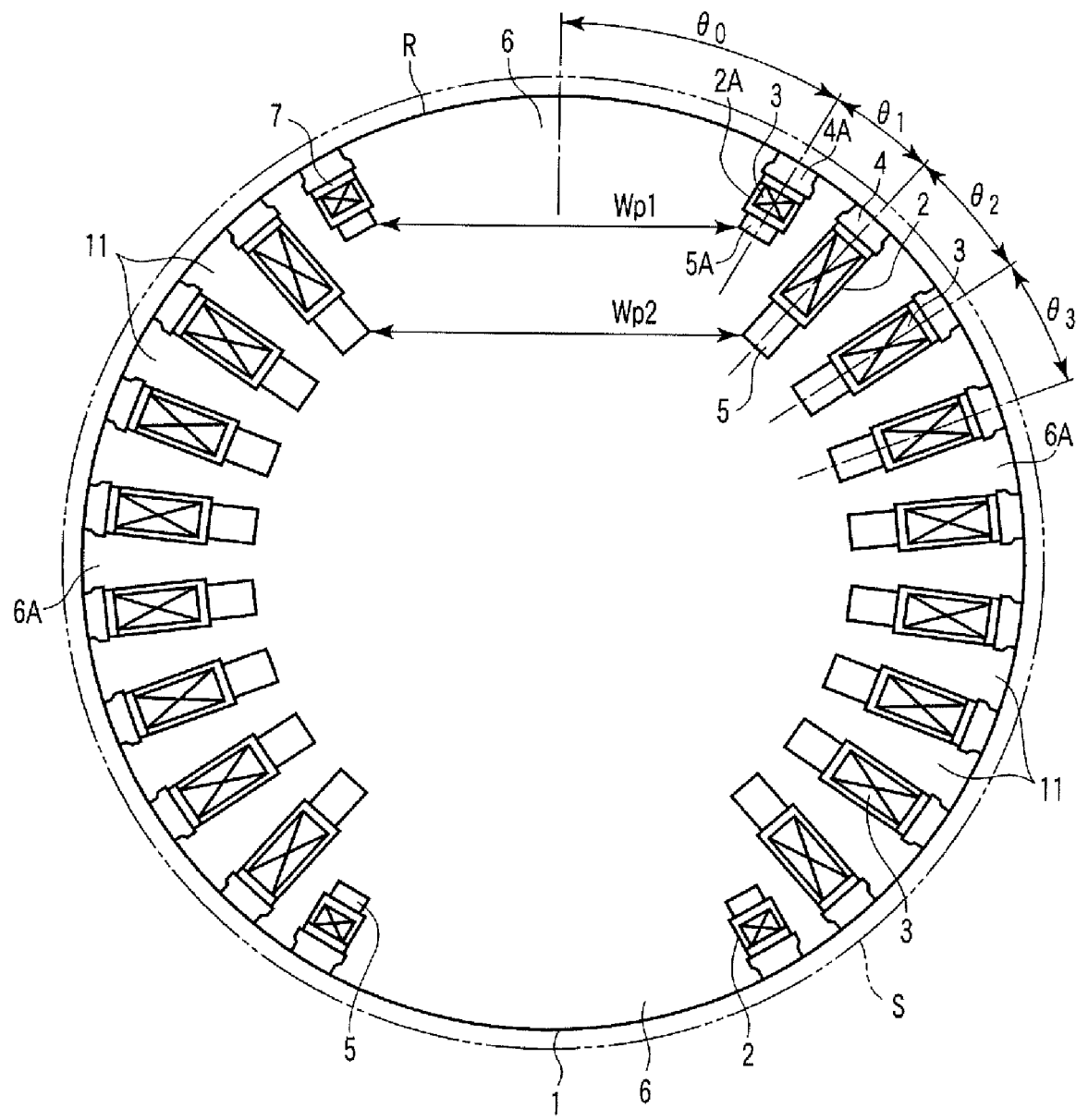
FIG. 1 is a sectional view of a first embodiment of a rotor of a rotary electric machine according to the invention.
Figure 2:
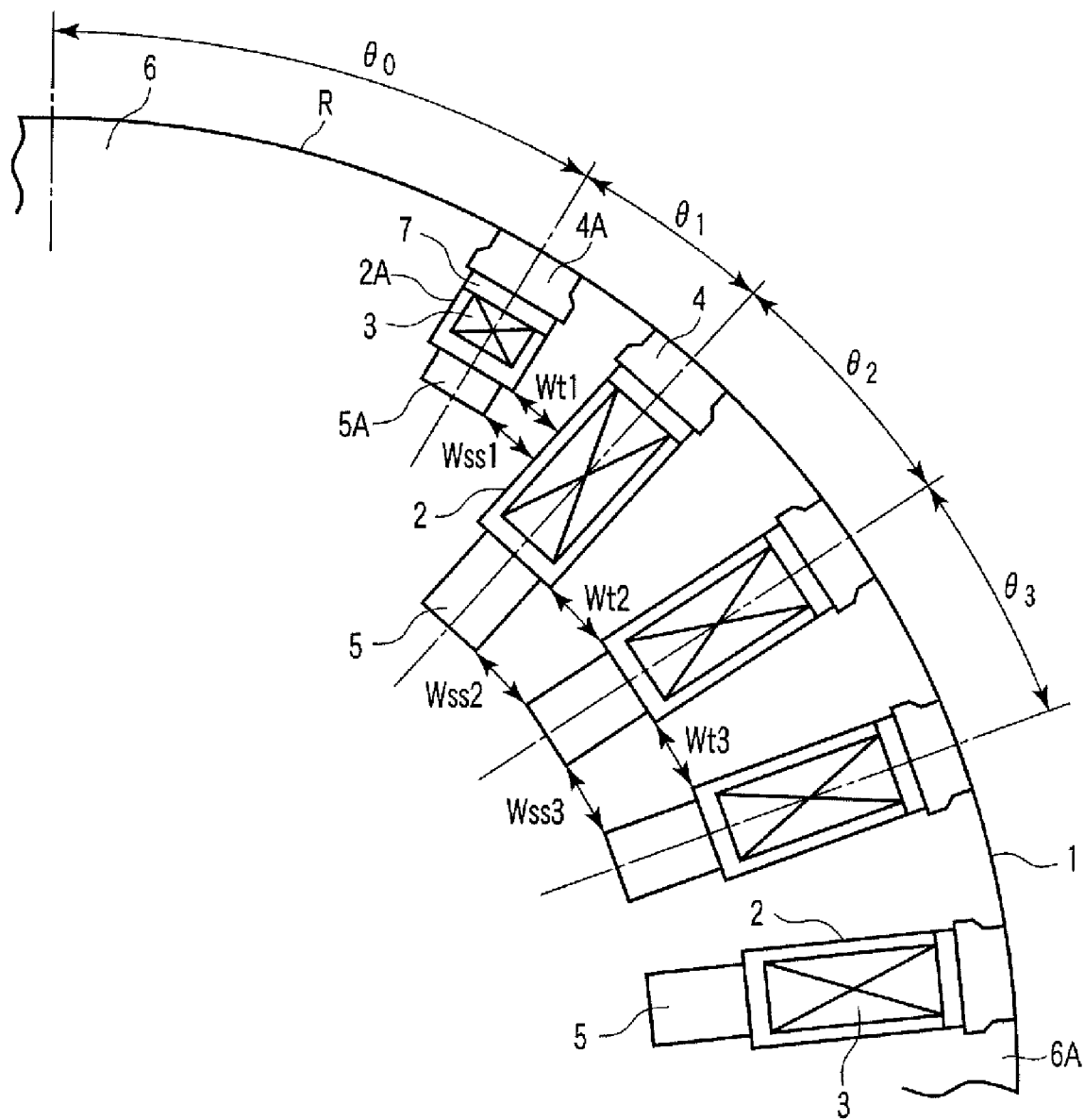
FIG. 2 is a magnified sectional view of a half pole part of the rotor and slots nearby in FIG. 1.
Figure 14:
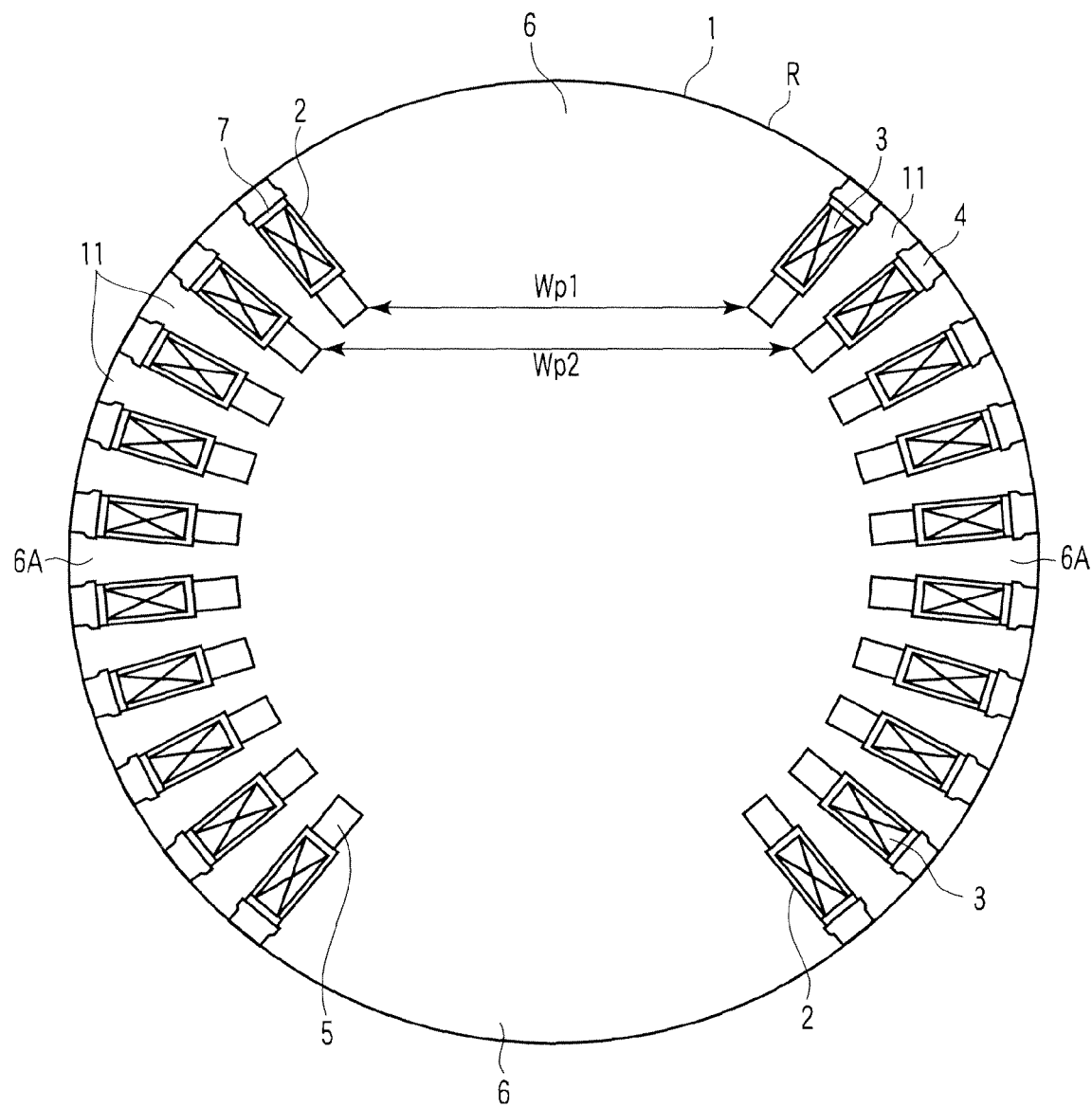
FIG. 14 is a sectional view of a rotor of a common electric machine.

FIG. 1 is a sectional view of a first embodiment of a rotor of a rotary electric machine according to the invention. FIG. 2 is a magnified sectional view of a half pole part of the rotor and slots nearby in FIG. 1. The same parts as those of FIG. 14 are given the same numerals as in FIG. 14, and explained hereinafter.

In FIG. 1, a reference numeral 1 denotes a rotor core made of single lump of steel to give a mechanical strength. A magnetic pole part 6 and a inter-pole part 6A are formed in the rotor core 1. In the inter-pole part 6A, a plurality of rotor slot 2 for inserting a winding is provided at regular intervals in the direction of the internal circumference of the rotor core 1, and teeth 11 are formed between the slots. A field coil 3 is housed in each rotor slot 2. A rotor is denoted by R, and a stator is denoted by S. The rotor R is arranged rotatable with a predetermined clearance to the stator S. The stator S and rotor R form a rotary electric machine.

Hereinafter, the rotary slot 2 nearest to the magnetic pole part 6 shown in the upper side in FIG. 1 will be called a first slot 2A, and the slots arranged farther from the magnetic pole part 6 will be called a second slot 2, a third slot 2, and so on.

In the rotary core 1, ten slots are provided on one side of the magnetic pole part 6. As the upper and lower sides and the left and right sides are symmetrical on the plane in the drawing, an explanation on the shape of a cross section will be given in the order of the first slot 2A to the fifth slot 2.

As shown in FIG. 1, the first slot 2A is shallower than the other slots, and the number of steps of a field coils in the first slot is made fewer than the field coil conductors in the second to fifth slots. In this case, the first slot 2A is at least 80% shallower than the other slots.

Figure 15:
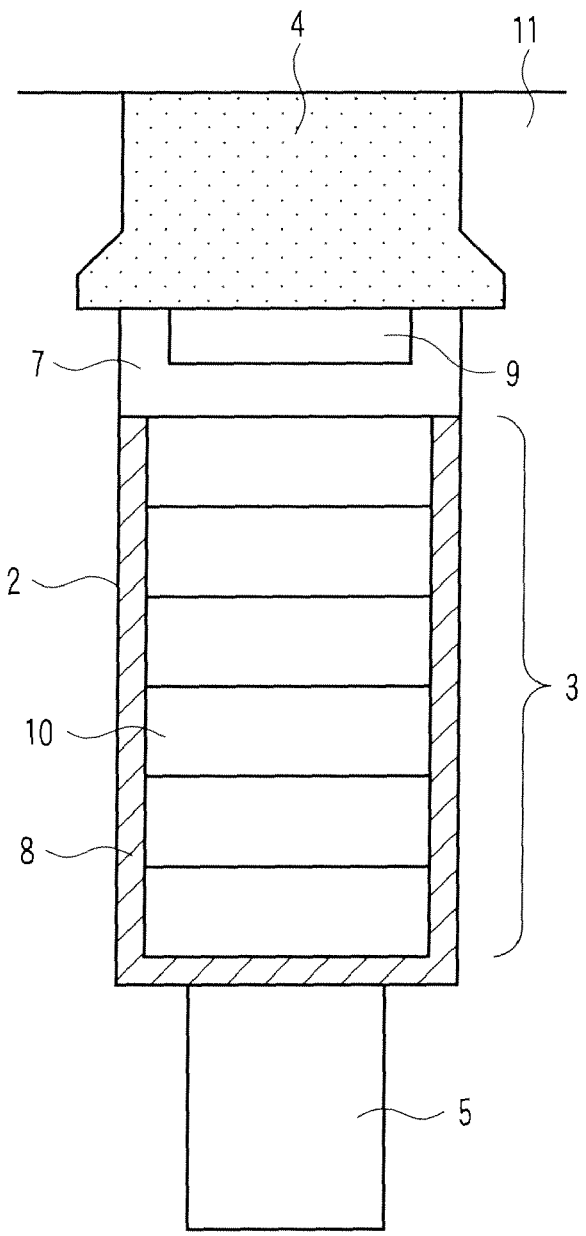
FIG. 15 is a magnified sectional view of a slot of a common rotor.

As shown in FIG. 15, in the field coil 3, a plurality of field coil conductor 10 is stacked in the radial direction, and a slot insulator 8 is provided between the field coil conductor 10 and the inside surface of the rotor slot 2, an insulation block 7 is provided between the field coil conductor 10 and a rotor wedge 4 provided at the open end of the rotor slot 2, thereby ensuring insulation among the field coil conductor 10, the rotor core 1 becoming an earth potential, and the rotor wedge 4.

Between the rotor wedge 4 and insulation block 7, a slot dumper 9 may be provided to decrease an eddy current loss caused by a harmonic magnetic field generated in the stator S.

Further, a subslot 5 serving as a ventilation path in the axial direction is provided at the bottom of the rotor slot 2, in being communicated to the bottom of the hole, a not-shown slit is provided as a ventilation path in the radial direction of the field coil 3 and rotor wedge 4, and the heat generated by Joule heating in the field coil 3 is cooled by a coolant supplied from the subslot 5.

The subslot 5 serves as a ventilation path for cooling the field coil 3 as described above, and in the first slot 2A with few steps of a field coil conductor, a loss (Joule loss) caused by a field current is considered to be relatively small. Therefore, the radial cross section area of the subslot 5A belonging to the first slot 2A is smaller than the radial cross section area of the subslot 5 belonging to the other slots is smaller.

In FIG. 1, the distance between the slots positioned on both sides of the magnetic pole part 6 is minimum at the bottom of the subslot 5A. When the minimum value between the slots is called a magnetic pole width of the slot, the magnetic pole width Wp1 of the first slot is substantially equal to the magnetic pole width Wp2 of the second slot, and equivalent to the magnetic pole width Wp1 shown in FIG. 14.

In FIG. 2, the shortest distance from the slot bottom of the first slot to the second slot will be called Wt1, the shortest distance from the subslot bottom of the first slot to the second slot will be called Wss1, the smaller one of them is called Wmin1, the shortest distance from the slot bottom of the second slot to the bottom of the third slot is called Wt2, and the shortest distance from the subslot bottom of the second slot to the subslot bottom of the third slot is called Wss2, the smaller one of them is called Wmin2. The distances between the bottoms and subslot bottoms of the third and fourth slots will be called likewise.

These distances are used as indices for expressing the mechanical strength of the teeth part. When the slot depth is different, for example, when the first slot is shallow as shown in the drawing, Wt1 indicates the shortest distance from the corner of the bottom of the first slot to the first slot side of the second slot, and Wss1 indicates the shortest distance from the corner of the subslot bottom of the first slot to the first slot side of the second slot.

When the rotor slots are arranged in the direction of internal circumference at equal intervals as shown in FIG. 14, Wss1 becomes larger than Wss2 as the first slot becomes shallower, and the mechanical strength is increased.

Therefore, in this embodiment, angle θ1 between the first and second slots viewed from the axis center is set smaller than angle θ2 between the second and third slots and angle θ3 between the third and fourth slots.

Further, as the first slot is shallower than the other slots, a centrifugal force applied to the field coils in the slot becomes smaller than that applied to the field coils in the other slots, a required mechanical strength of the teeth between the first and second slots becomes smaller than that required for the other teeth, and the width of the tooth Wmin1 may be smaller than Wmin2.

In the rotor R of a rotary electric machine configured as above, when the field coil 3 is excited, a magnetic flux is generated in the magnetic pole part 6. As the flow of the magnetic flux is generally restricted by the smaller of the magnetic pole width Wp1 of the first slot and Wp2 of the second slot, a magnetic path equivalent to the smaller magnetic pole width Wp1 of the first slot shown in FIG. 14 is ensured, and an equivalent magnetic flux can be generated.

Further, when the width is equivalent to the magnetic pole width Wp1 of the first slot as shown in FIG. 14, angle θ0 from the magnetic pole center to the first slot viewed from the axis center is smaller by the extent that the first slot is shallower than the other slots. Further, considering the fact that angle θ1 between the first and second slots is smaller than the angle (θ2 and after) between the other slots, the angle between slots except θ1 is larger than the example shown in FIG. 14.

Therefore, the mechanical strength is decreased in the places corresponding to the distance Wt2 from the slot bottom of the second slot to the slot bottom of the third slot, the distance Wt3 from the slot bottom of the third slot to the slot bottom of the fourth slot, the distance Wss2 from the subslot bottom of the second slot to the slot bottom of the third slot, the distance Wss3 from the subslot bottom of the third slot to the subslot of the fourth slot. The radial cross section area of the field coil 3 can be increased by increasing the slot width.

In the first slot, though the radial cross section area of the field coil is decreased by making the slot shallow, the effect of increasing the radial cross section area by increasing the slot width is larger, and the radial cross section area of the field coil can be increased as a whole slot.

According to this embodiment, as the area of the field coil conductor in the radial cross section of the rotor R can be increased under the same magnetic pole width that is a magnetic flux flow path, a loss caused by supplying a field current (loss by Joule heating) can be decreased, efficiency of the rotary electric machine can be improved, and overheating of the field coil 3 can be prevented.

Figure 3:
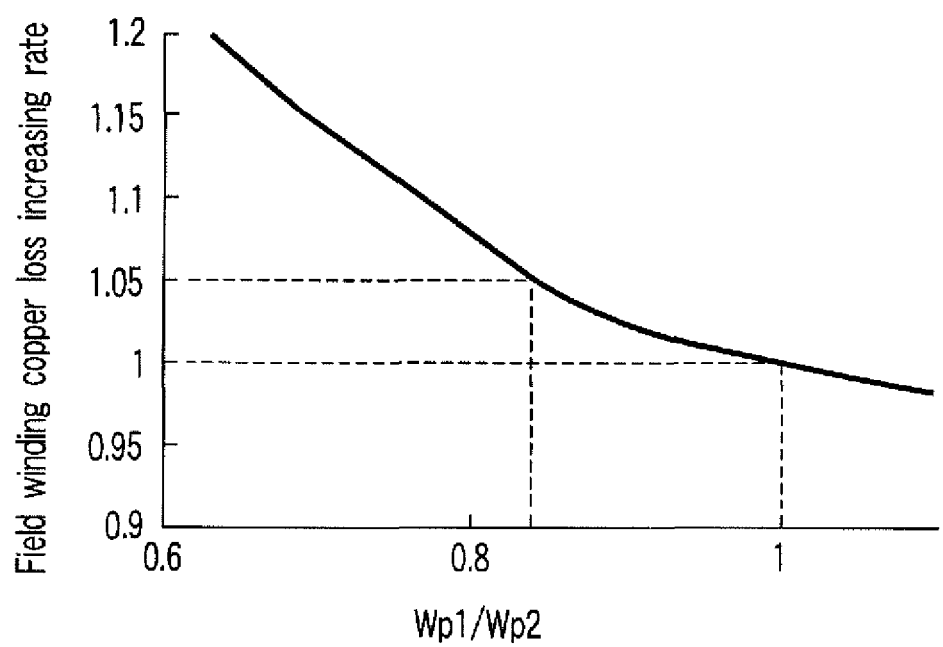
FIG. 3 is a graph showing the result of calculating a field winding copper loss increasing rate in the same embodiment.

FIG. 3 shows an example showing the relationship between the ratio of magnetic pole widths of first and second slots Wp1/Wp2 and a field winding copper loss increasing rate by applying this embodiment to a typical rotary electric machine. The value of Wp2 is assumed to be constant in this example.

In FIG. 3, when the ratio of the magnetic pole widths of the first and second slots Wp1/Wp2 is increased, or when the magnetic pole is relatively narrowed at the position of the first slot, magnetic saturation of the magnetic pole 6 is increased, and a field current is increased. Thus, a Joule loss in the field coil 3 is increased.

As seen from FIG. 3, when Wp1 is approximately 85% of Wp2, a loss in the field coil 3 is increased by approximately 5%, compared with when Wp1 and Wp2 are equal.

This value varies according to designs and specifications of a model, but becomes equivalent in most cases. Therefore, it is desirable to set Wp1 to 85% or more of WP2.

In the embodiment 1, a model with the subslot 5 is described. When the subslot 5 is not provided, the same configuration is applicable only to a slot bottom.

Embodiment 2

Figure 4:
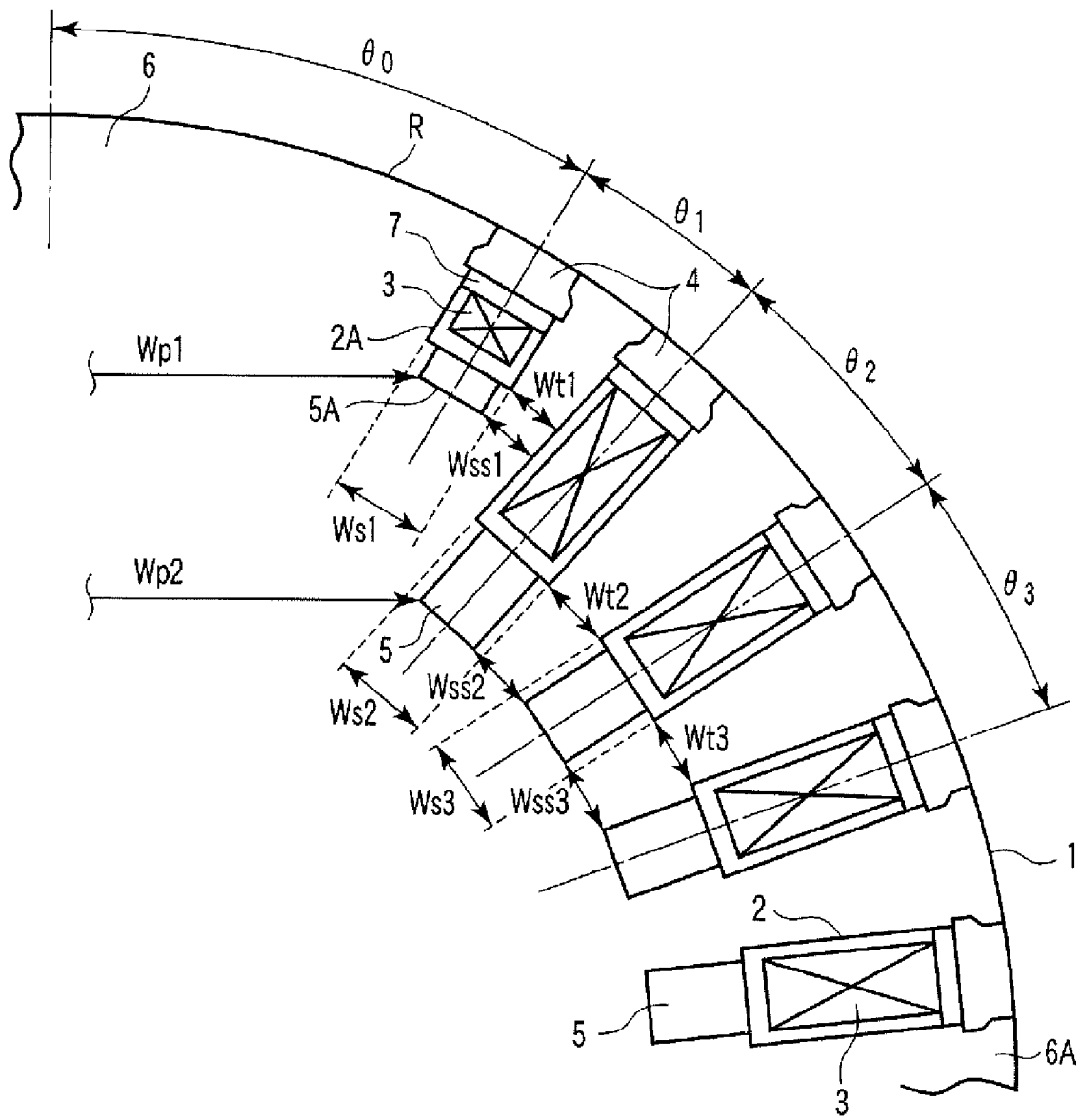
FIG. 4 is a sectional view of a half pole part of a rotor of a rotary electric machine and slots nearby, according to a second embodiment of the invention.

FIG. 4 is a sectional view of a half pole part of a rotor R of a rotary electric machine and slots nearby, according to a second embodiment of the invention. Explanation will be omitted for the same components as in FIG. 1 and FIG. 2. Only different components will be explained. A subslot is denoted by 5A in FIG. 4.

In this embodiment, as shown in FIG. 4, angle θ1 between a first slot 2A and second slot 2 viewed from the axis center is set to the same as angles θ2 and θ3 between the other slots, and the slot width Ws1 of the first slot 2A is set to larger than the slot width Ws2 of the second slot and the slot width Ws3 of the third slot.

As the first slot 2A is made shallow, an allowance is given to the distances Wt1 between slot bottoms (teeth) and Wss1 between subslot bottoms of the first and second slots, and the distances Wt1 and Wss1 can be made close to Wt2 and Wss2 of the second and subsequent slots by the same extent by increasing the slot width.

In the drawing, wt1 and Wss1 are larger than Wt2 and Wss2, but the first slot 2A is shallow, and the centrifugal force applied to the field coil conductor 10 in the slot is small, and Wt1 and Wss1 can be made smaller than Wt2 and Wss2 by the same extent.

As for the magnetic pole width Wp1 of the first slot 2A, the magnetic pole width Wp1 of the subslot bottom is minimum in FIG. 4, but the slot width can be increased until the magnetic pole width Wp1' of the slot bottom becomes equivalent to Wp1.

In this embodiment, if the radial sectional area of the field coil 3 in the first slot 2A is the same, the first slot 2A can be made shallower by increasing the width of the first slot 2A to be greater than that of the other slots 2. Angle θ0 from the magnetic pole center to the first slot center viewed from the axis center can be made smaller by the same extent, and the angle between slots can be increased as a whole. Therefore, the radial cross section area of the field coil conductor 10 can be increased by increasing the widths of the other slots, and a Joule loss in the field coil can be decreased.

Embodiment 3

Figure 5:
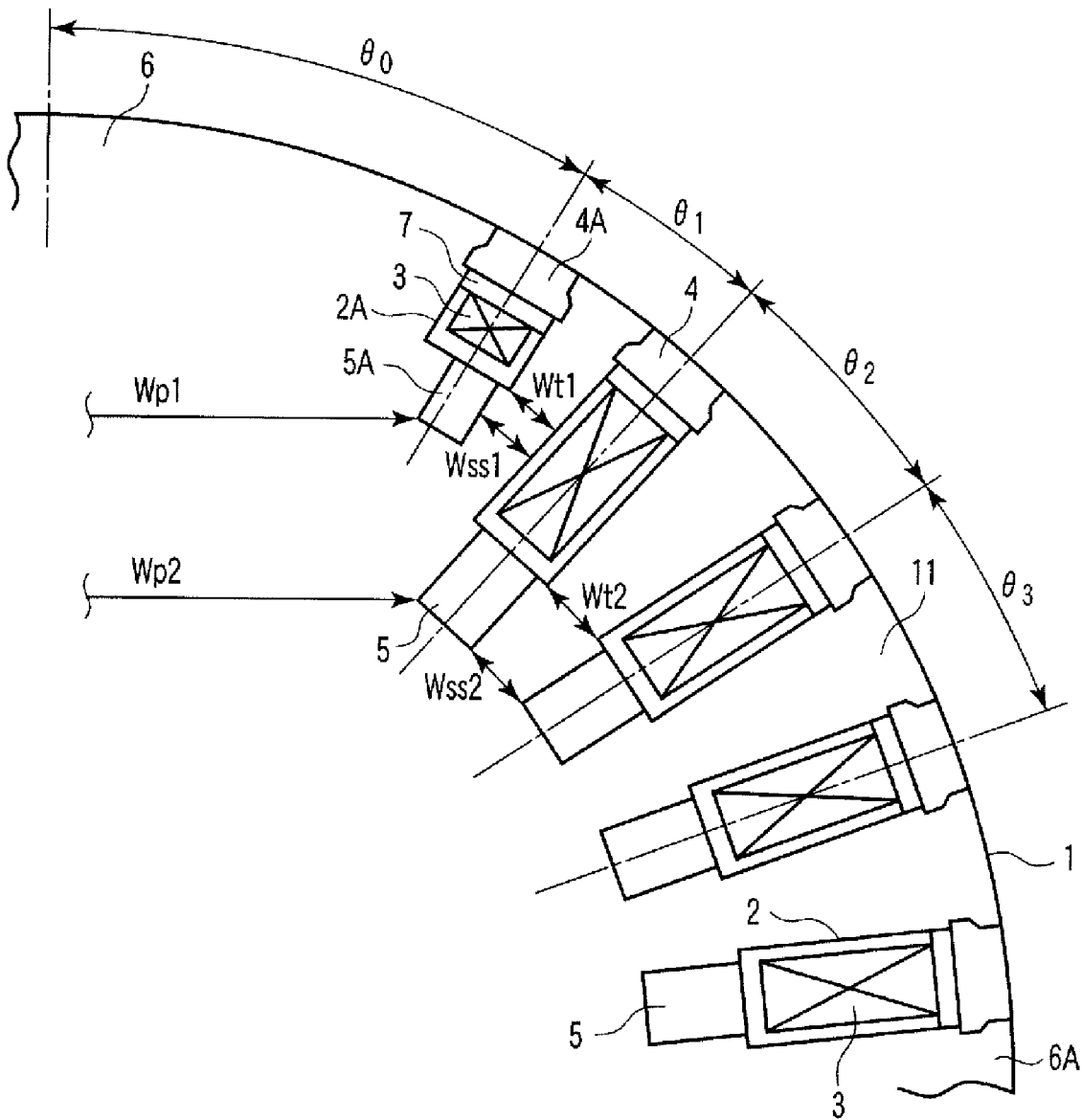
FIG. 5 is a sectional view of a half pole part of a rotor of a rotary electric machine and slots nearby, according to a third embodiment of the invention.

FIG. 5 is a sectional view of a half pole part of a rotor R of a rotary electric machine and slots nearby, according to a third embodiment of the invention. Explanation will be omitted for the same components as in FIG. 1 and FIG. 2. Only different components will be explained.

In this embodiment, as shown in FIG. 5, the center of the direction of the internal circumference of the subslot 5A of the first slot 2A is displaced to a position away from the magnetic pole part 6, compared with the center of the direction of the internal circumference of the rotor slot 2A.

Usually, as a subslot holds a coil in a slot when assembling, a subslot is made narrower than a slot, and a slot bottom is constructed to have a step. For this reason, as the subslot 5A is displaced to a position away from the magnetic pole part 6 in FIG. 5, a subslot is made narrower than the subslots 5 of the other slots, and a subslot is made deep, thereby ensuring a ventilation path.

According to this embodiment, the magnetic pole width Wp1 can be increased. In other viewpoint, when the magnetic pole width Wp1 is assumed to be constant, angle θ0 from the magnetic pole center to the first slot 2A can be reduced by the same extent, the slot width can be increased, and the radial cross section area of the field coil 3 can be increased by increasing the slot width.

Embodiment 4

Figure 6:
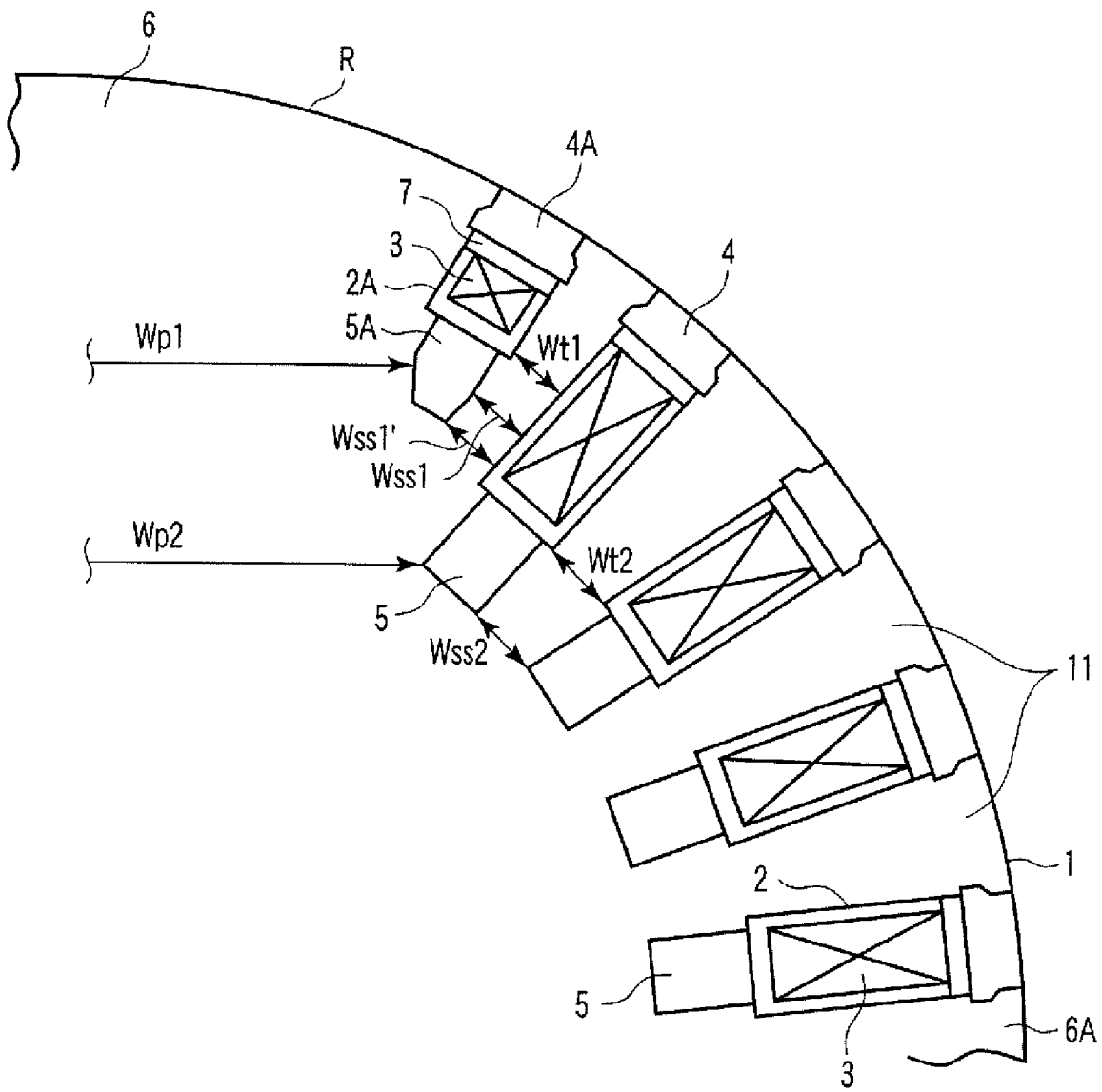
FIG. 6 is a sectional view of a half pole part of a rotor of a rotary electric machine and slots nearby, according to a fourth embodiment of the invention.

FIG. 6 is a sectional view of a half pole part of a rotor R of a rotary electric machine and slots nearby, according to a fourth embodiment of the invention. Explanation will be omitted for the same components as in FIG. 1 and FIG. 2. Only different components will be explained.

In this embodiment, as shown in FIG. 6, the magnetic pole part of the bottom of the subslot 5A of the first slot 2A is chamfered, and the chamfered surface is made substantially parallel to the magnetic pole axis.

Usually, a subslot is rectangular in the radial cross section, and the magnetic pole width is determined by the magnetic pole side bottom of a subslot. However, in this embodiment, the magnetic pole side bottom of the subslot 5A is chamfered, and the magnetic pole width can be increased by the same extent.

Therefore, in such a configuration, the magnetic pole width Wp1 of the first slot can be increased to wider than a rectangular subslot. In other viewpoint, when the magnetic pole width Wp1 is assumed to be constant, the slot interval can be increased by the same extent by decreasing the angle from the magnetic pole center to the first slot 2A. Therefore, the radial cross section area of the field coil 3 can be increased by increasing the slot width.

Embodiment 5

Figure 7:
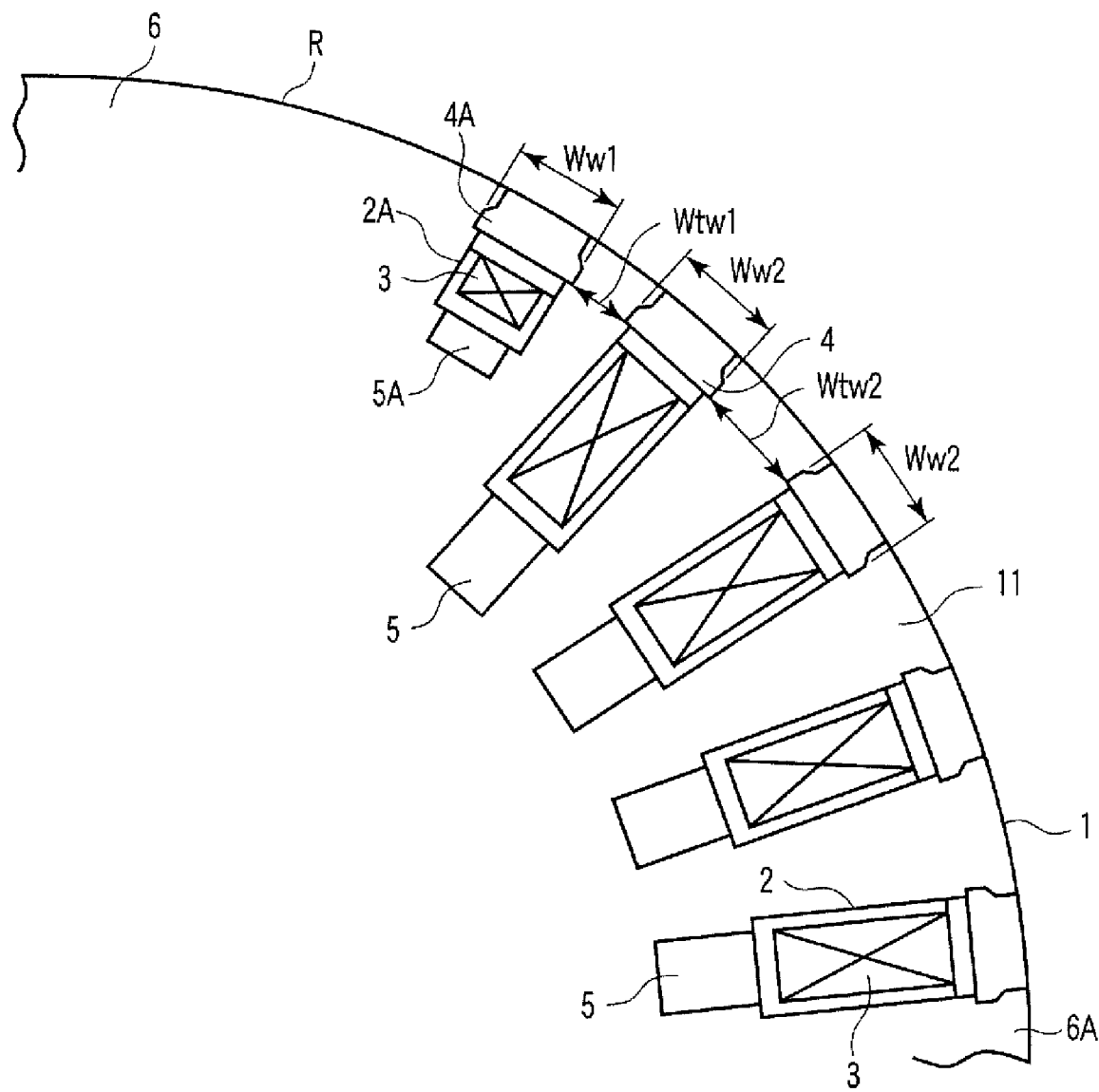
FIG. 7 is a sectional view of a half pole part of a rotor of a rotary electric machine and slots nearby, according to a fifth embodiment of the invention.

FIG. 7 is a sectional view of a half pole part of a rotor R of a rotary electric machine and slots nearby, according to a fifth embodiment of the invention. Explanation will be omitted for the same components as in FIG. 1 and FIG. 2. Only different components will be explained.

In FIG. 7, the field coil 3 is held by the wedge 4 provided in the opening made in the outside diameter side of the rotor slot 2. However, as the first slot 2A is shallower than the other slots 2, the centrifugal force applied to the field coil 3 in the slot is smaller than that applied to the field coils 3 in the other slots, and the mechanical strength required by the wedge 4A of the first slot is lower than the mechanical strength required by the wedges 4 of the other slots.

Therefore, in this embodiment, the width Ww1 of the wedge 4A of the first slot 2A is made less than the wedge widths Ww2 of the other slots.

In such a configuration, while the tooth width between the wedges 4 is held at Wtw1 between the first and second slots, the radial cross section area of the field coils can be increased by decreasing the interval between the first slot 2A and second slot 2, and increasing the whole slot width.

Embodiment 6

Figure 8:
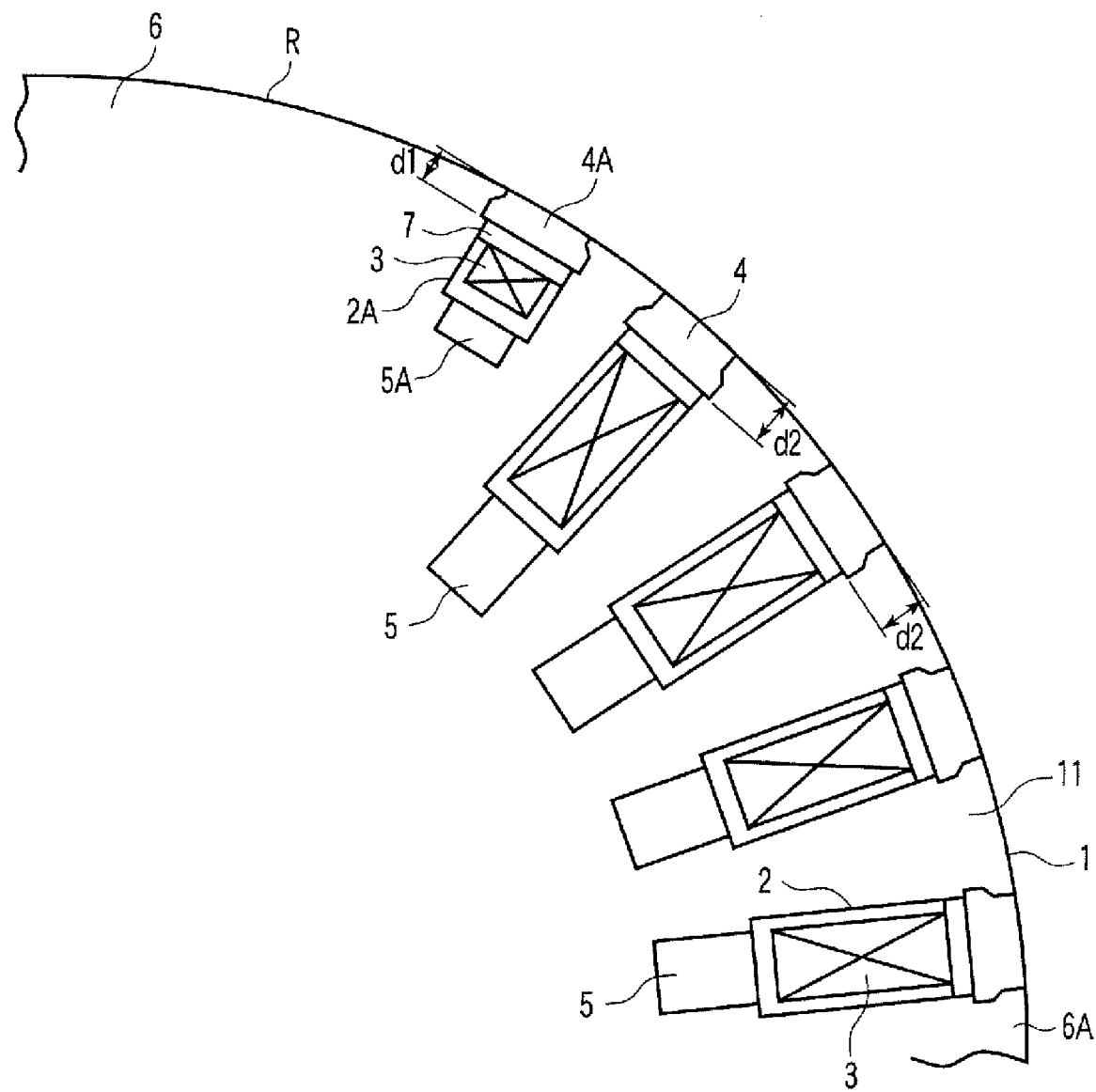
FIG. 8 is a sectional view of a half pole part of a rotor of a rotary electric machine and slots nearby, according to a sixth embodiment of the invention.

FIG. 8 is a sectional view of a half pole part of a rotor R of a rotary electric machine and slots nearby, according to a sixth embodiment of the invention. Explanation will be omitted for the same components as in FIG. 1 and FIG. 2. Only different components will be explained.

In FIG. 8, the field coil 3 is held by the wedge 4 provided in the opening made in the outside diameter side of the rotor slot 2. However, as the first slot 2A is shallower than the other slots 2, the centrifugal force applied to the field coil 3 in the slot is smaller than that applied to the field coils 3 in the other slots, and the mechanical strength required by the wedge 4A of the first slot is lower than the mechanical strength required by the wedges 4 of the other slots.

Therefore, in this embodiment, the thickness d1 of the wedge 4A of the first slot 2A is made less than the thickness d2 of the other slots.

In such a configuration, the slot bottom and subslot bottom of the first slot 2A can be shifted to the outside diameter side in the radial direction, and the magnetic pole width Wp1 is increased by the same extent. The amount of material of the wedge 4A can be decreased, contributing to resource savings.

Embodiment 7

Figure 9:
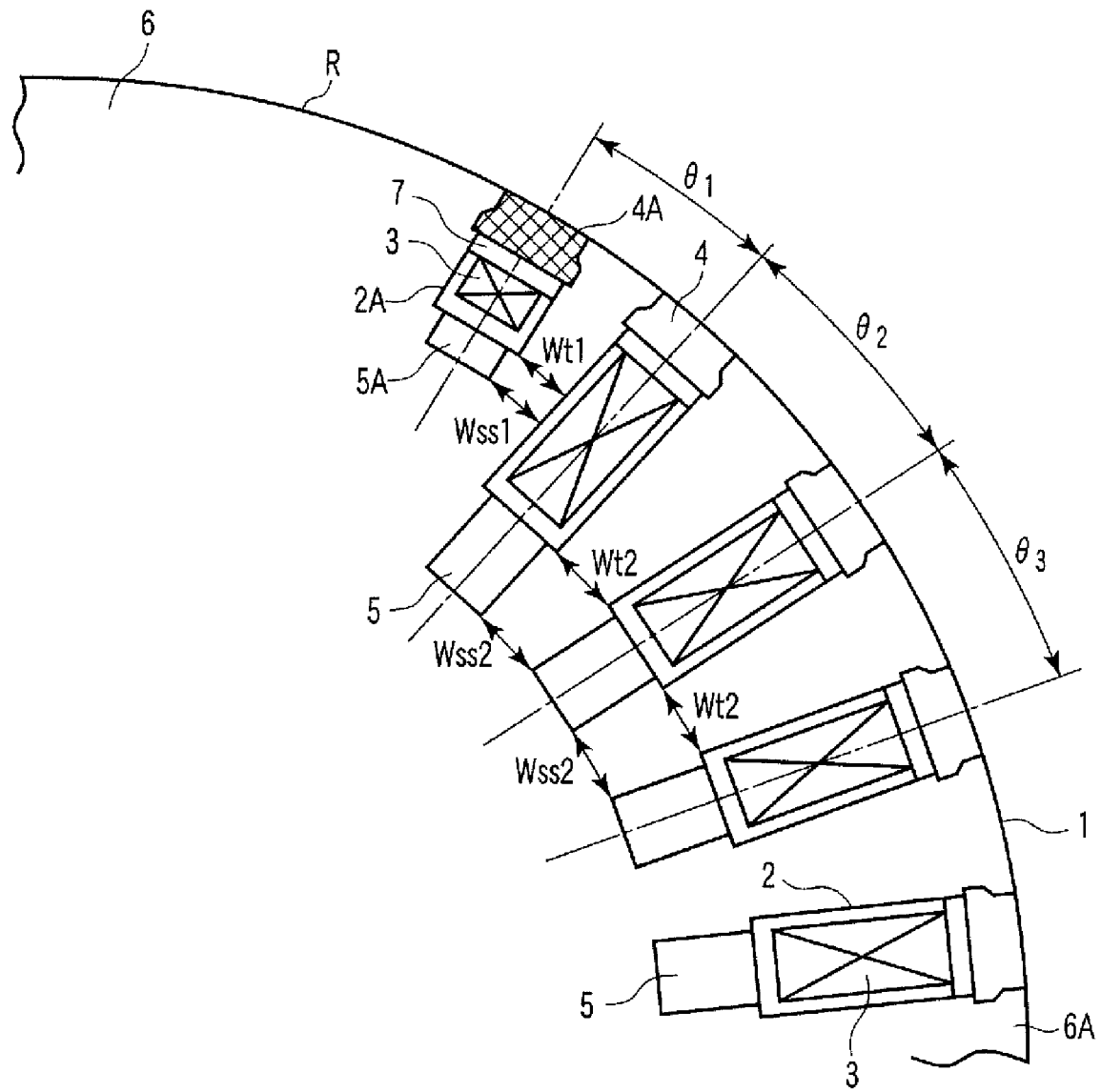
FIG. 9 is a sectional view of a half pole part of a rotor of a rotary electric machine and slots nearby, according to seventh and eighth embodiments of the invention.

FIG. 9 is a sectional view of a half pole part of a rotor R of a rotary electric machine and slots nearby, according to a seventh embodiment of the invention. Explanation will be omitted for the same components as in FIG. 1 and FIG. 2. Only different components will be explained.

In this embodiment, as shown in FIG. 9, the wedge 4A made of magnetic material is used as a wedge to hold the field coil 3 provided in the opening made in the outside diameter side of the slot 2, and the wedge 4 made of non-magnetic material is used for the other slots.

In the rotor R of a rotary electric machine according to the invention, the first slot 2A is made shallower than the other slots 2, and when the magnetic pole width of the first slot is made equivalent to a conventional width, the surface of the rotor of the magnetic pole part 6 becomes narrower than a conventional structure. Thus, a waveform of a magnetic flux in a gap becomes close to a square wave, and a harmonic component is increased.

By using a magnetic material for the wedge 4A of the first slot, as in this embodiment, a waveform of a magnetic flux in a gap can be made close to a smoother trapezoidal waveform. Therefore, a harmonic component can be decreased, a field current for generating a magnetic flux of a fundamental waveform component can be decreased, an iron loss in the stator can be decreased, and an output voltage waveform can be improved.

Embodiment 8

The configuration of the embodiment 8 is apparently the same as the embodiment 7 shown in FIG. 9, and an illustration is omitted, and an explanation will be given by using FIG. 9.

In this embodiment, as shown in FIG. 9, the wedge 4A of the first slot is made of a material with a mechanical strength lower than the wedge 4 of the other slots. Since the first slot 2A is shallower than the other slots 2 as described hereinbefore, the centrifugal force applied to the field coil 3 in the first slot is smaller than that applied to the field coils 3 in the other slots, and the wedge 4A of the first slot requires a mechanical strength smaller than that required by the wedges 4 of the other slots.

In such a configuration, the manufacturing cost can be decreased by using an inexpensive material for the wedge 4A of the first slot 2A. Further, when the magnetic wedge described in the embodiment 7 is used, the material can be determined by giving priority to a magnetic characteristic rather than a mechanical strength.

Embodiment 9

Figure 10:
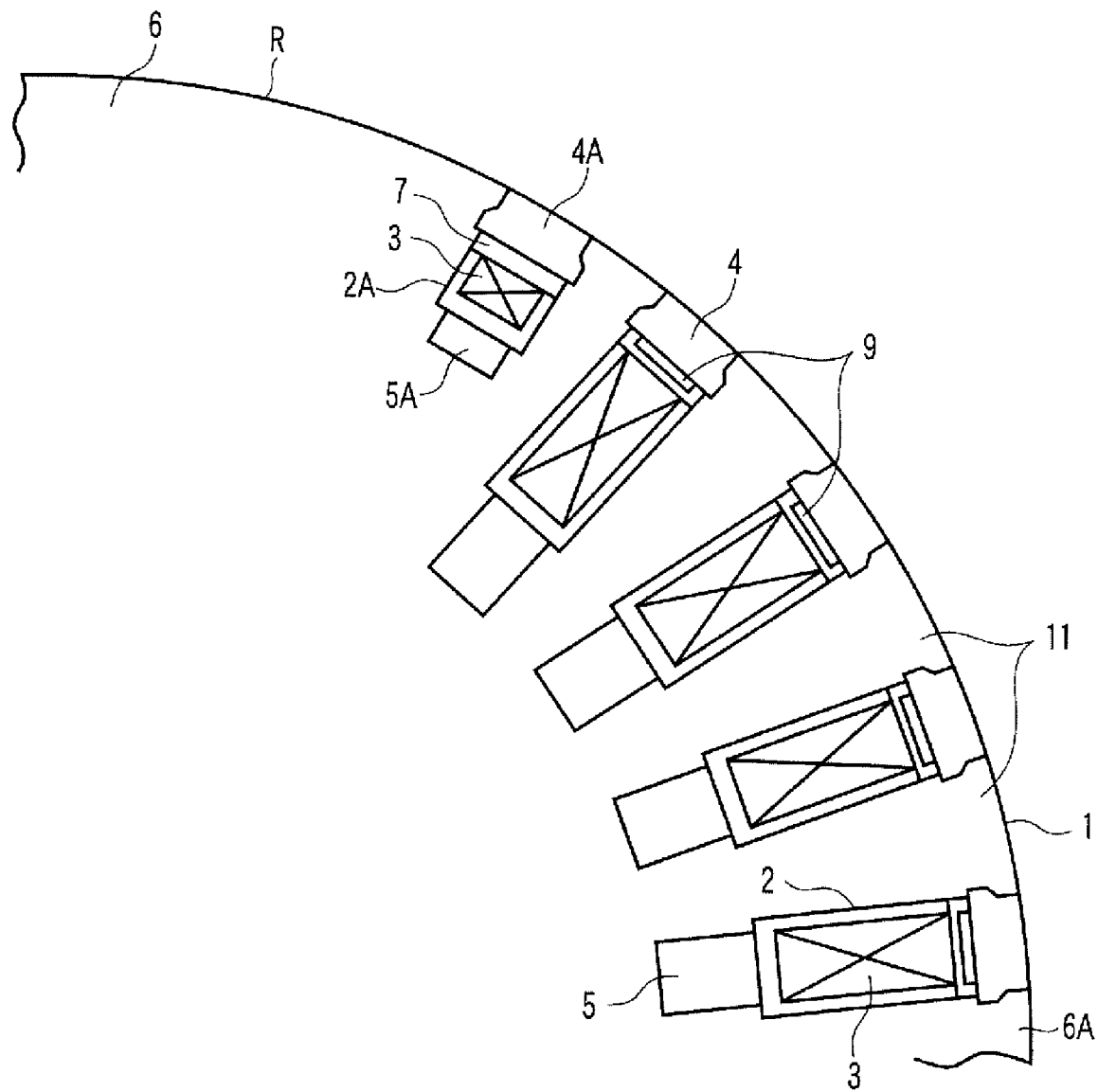
FIG. 10 is a sectional view of a half pole part of a rotor of a rotary electric machine and slots nearby, according to a ninth embodiment of the invention.

FIG. 10 is a sectional view of a half pole part of a rotor R of a rotary electric machine and slots nearby, according to a ninth embodiment of the invention. Explanation will be omitted for the same components as in FIG. 1 and FIG. 2. Only different components will be explained.

In this embodiment, as shown in FIG. 10, a slot damper 9 is provided between the rotor wedge 4 and insulation block 7 in the slots 2 other than the first slot 2A.

The slot damper 9 is usually provided to decrease an eddy current loss caused by a harmonic magnetic field generated in a stator, as explained in FIG. 14. In the rotor R of a rotary electric machine according to the invention, the first slot 2A is shallower than the other slots 2, and if the magnetic pole width of the first slot is set to the same as a conventional value, the rotor surface of the magnetic pole part 6 becomes narrower than a conventional value. Therefore, an eddy current path on the outside diameter side surface of the magnetic pole part 6 becomes narrow, and eddy current loss is decreased. Even if the slot damper of the first slot is omitted, overheating caused by an eddy current loss or a decrease in efficiency occurs very rarely.

Therefore, when a slot damper is not provided only in the first slot, the amount of material such as copper can be decreased, and the area of the field coil 3 of the first slot can be increased.

Embodiment 10

Figure 11:
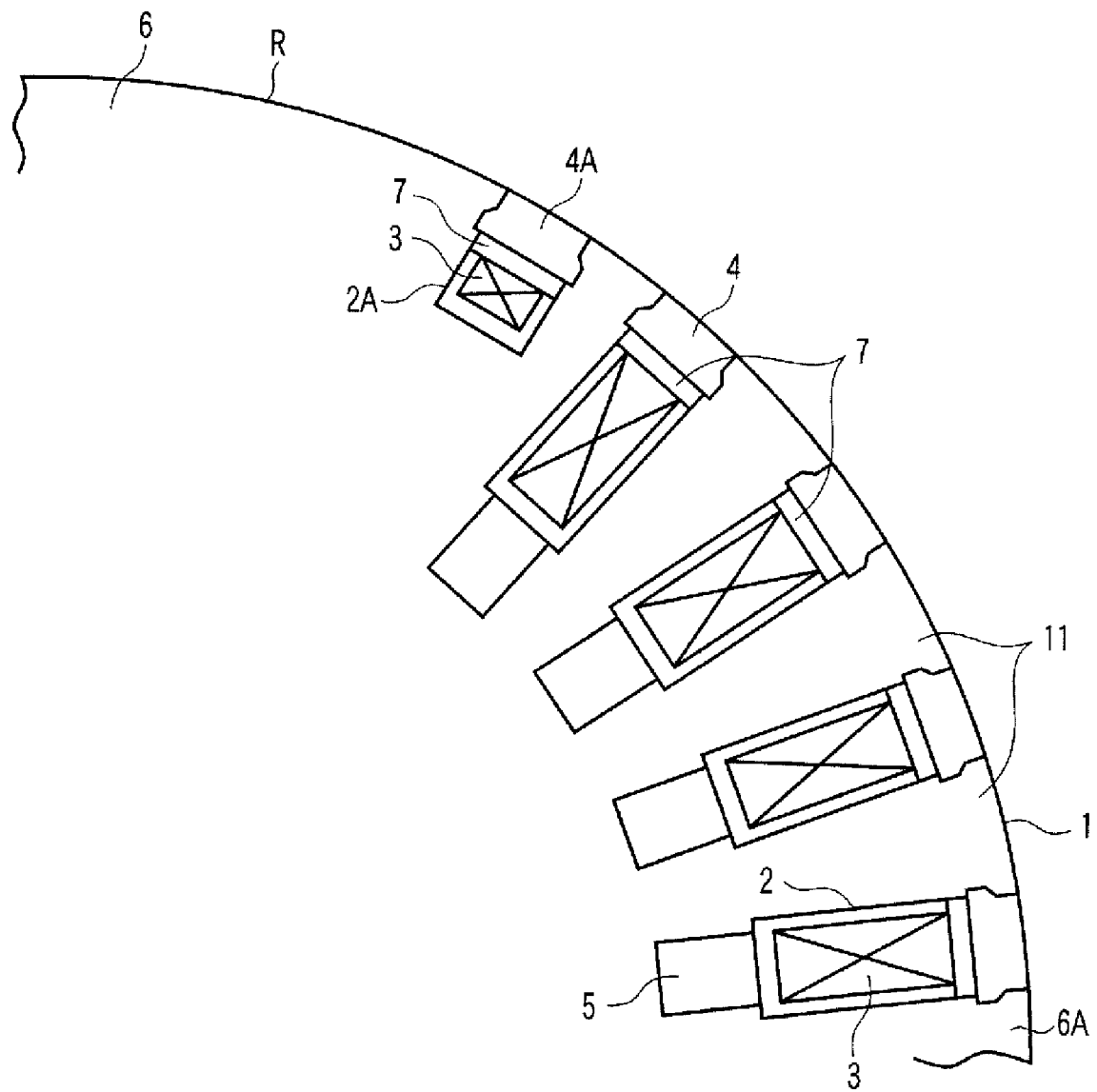
FIG. 11 is a sectional view of a half pole part of a rotor of a rotary electric machine and slots nearby, according to a tenth embodiment of the invention.

FIG. 11 is a sectional view of a half pole part of a rotor R of a rotary electric machine and slots nearby, according to a tenth embodiment of the invention. Explanation will be omitted for the same components as in FIG. 1 and FIG. 2. Only different components will be explained.

In this embodiment, as shown in FIG. 11, a subslot is not provided at the bottom of the fist slot 2A, and a subslot 5 is provided at the bottoms of the other slots 2.

The first slot 2A has high thermal conductivity to the adjacent magnetic pole compared with the other slots 2, and is advantageous for cooling. Further, as the number of stacked field coil conductors 10 is small, a heating value is small. Therefore, in certain design conditions, the field coil 3 can be kept at a good temperature without ventilating a coolant by providing the subslot 5 as in the other slots 2.

Therefore, in such a configuration, as a subslot is not provided in the first slot 2A, if a magnetic pole width is the same, the whole slot interval can be increased by shifting the whole slot to the magnetic pole side, and the area of the field coil 3 can be increased by the same extent by increasing the slot width.

Next, an explanation will be given on a modification of the embodiment 10 of the invention.

Figure 12:
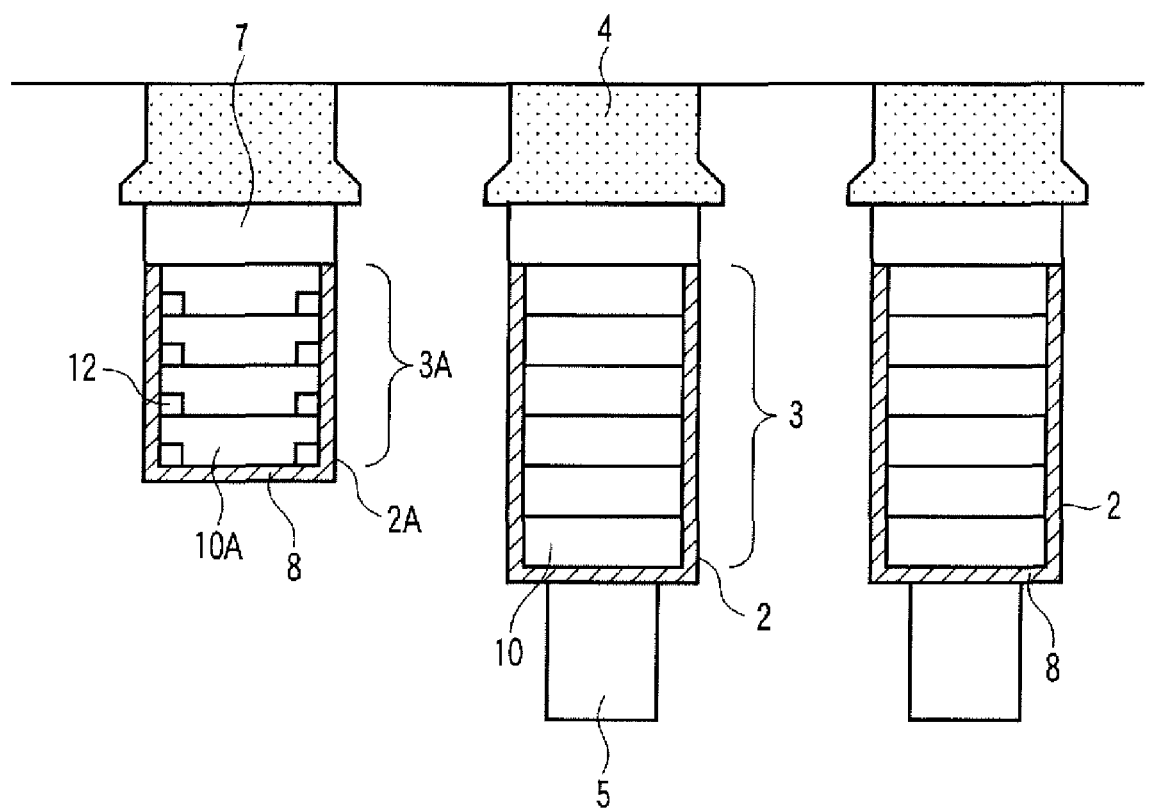
FIG. 12 is a magnified sectional view of first to third slots on one side viewed from the axis center of a magnetic pole, as a modification of the tenth embodiment of the invention.

FIG. 12 is a magnified sectional view of first to third slots on one side viewed from the axis center of a magnetic pole. These slots are actually arranged like a circular arc, but shown in being arranged in the horizontal direction in the drawing.

In FIG. 12, the slots except the first slot 2A are configured as in a conventional example. Only the first slot 2A is not provided with a subslot, a T-shaped field coil conductor 10A is stacked in the radial direction in the field coil 3A, and an in-slot ventilation path 12 is provided in the axial direction between the field coil conductor 10A and slot insulator 8.

Cooling gas is supplied to the in-slot ventilation path 12 from the end portion of a not-shown iron core, and a coolant is flowed to a gap through a slit provided in the outside diameter direction, at a certain inside position in the axial direction, for cooling the heat generated by a Joule loss occurred in the field coil 3A.

Such a cooling system is inferior in a cooling performance to a cooling system used for the slots other than the first slot, but advantageous for cooling the first slot 2A, as heat is conducted to the magnetic pole part 6. Therefore, in certain design conditions, the field coil can be kept at a good temperature without ventilation a coolant by providing the subslot 5 as in the other slots 2.

The shape of the field coil conductor 10A may be different from the example in FIG. 12, as long as a similar ventilation path in the axial direction can be ensured.

Figure 13:
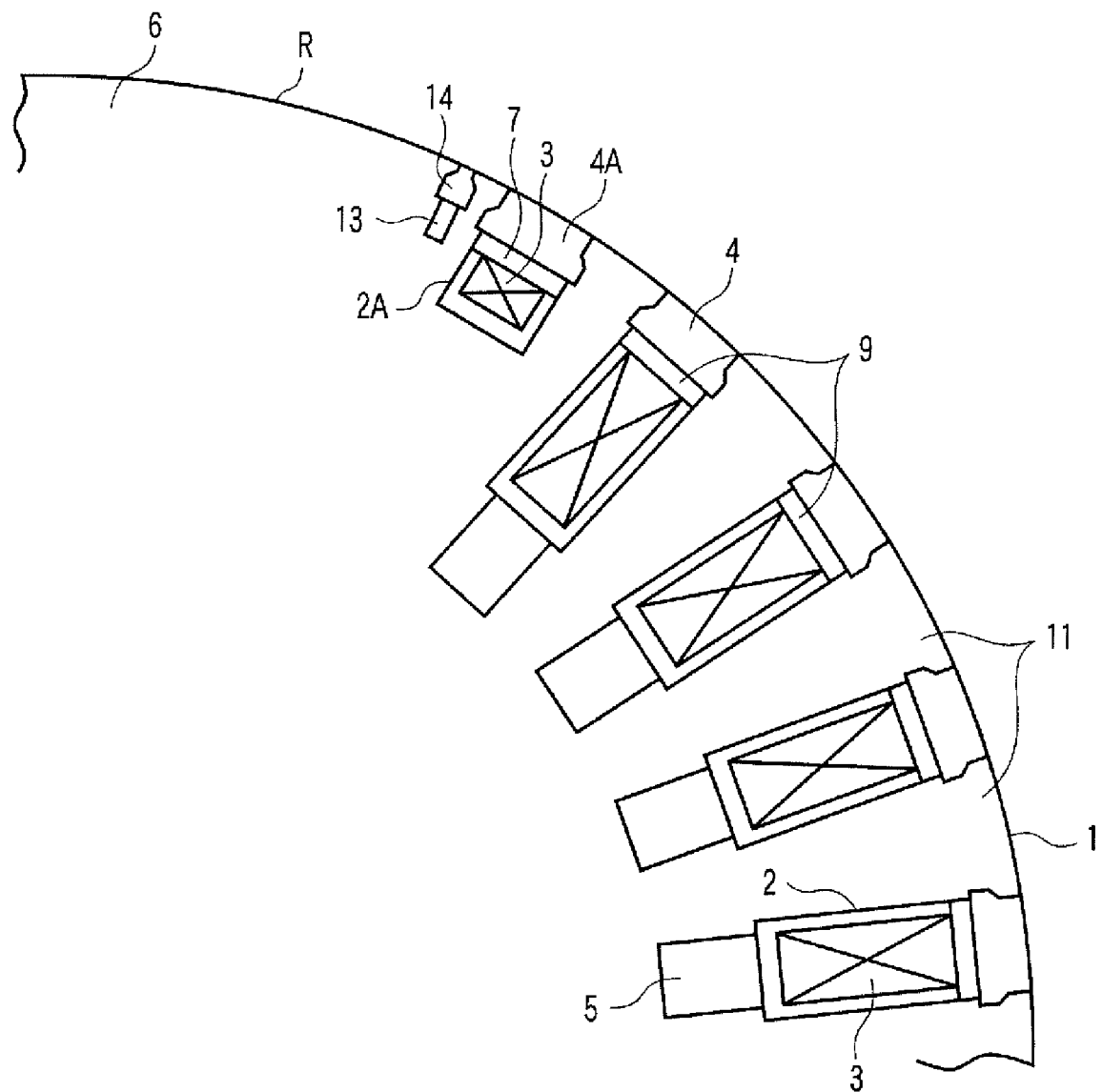
FIG. 13 is a sectional view of a half pole part of a rotor of a rotary electric machine and slots nearby, as another modification of the tenth embodiment of the invention.

FIG. 13 a sectional view of a half pole part of a rotor of a rotary electric machine and slots nearby, as another modification different from the above described one.

As shown in FIG. 13, a magnetic pole ventilation path 13 is basically provided in the vicinity of the first slot side end portion of the magnetic pole 6, in addition to the configuration shown in FIG. 11.

The magnetic pole ventilation path 13 may be formed by providing a slit in the magnetic pole part 6 in the axial direction if possible in workmanship, but actually formed by digging a ditch from the outside diameter side of the magnetic pole part 6 and covering the ditch by a magnetic pole ventilation path wedge 14.

The magnetic pole ventilation path wedge 14 can flow a coolant in the magnetic pole ventilation path 13 in good condition, by providing a hole in the radial direction at a certain position, or by providing a part with no magnetic pole ventilation path wedge 14 at a certain position in the axial direction, and flowing a coolant ventilated in the axial direction in the radial direction.

In such a configuration, heat generated in the field coil 3A of the first slot can be efficiently cooled, and the field coil can be kept at a good temperature.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A rotor of a rotary electric machine comprising:
    a rotor core, which has a magnetic pole, and rotor slots for inserting a winding formed in a part other than the magnetic pole part, wherein the depth from the open end of a rotor slot closest to the magnetic pole to a slot bottom is made less than the depth of slots at and after a second slot counted from the magnetic pole side in the direction of internal circumference, and when a shortest distance between the bottoms of the rotor slots opposed to each other through the magnetic pole is assumed to be a magnetic pole width of the slots, a magnetic pole width $Wp1$ of a slot closest to the magnetic pole is set to 85% or more of a magnetic pole width $Wp2$ of a second slot counted from the magnetic pole side in the direction of internal circumference;
    a field coil composed of field coil conductors inserted into the rotor slot; and
    a rotor wedge which is inserted into the opening of the rotor slot, and holds the field coil, wherein when a shortest distance between said adjacent rotor slots along a circumferential direction is assumed to be $Wt1$ and $Wt2$ sequentially from the magnetic pole $Wt1 \leq Wt2$.

2. The rotor of a rotary electric machine according to claim 1, wherein when an angle between said adjacent rotor slots in the direction of internal circumference is assumed to be $\theta1$ and $\theta2$ sequentially from the magnetic pole, $\theta1 < \theta2$.

3. The rotor of a rotary electric machine according to claim 1, wherein the width of a rotor slot closest to the magnetic pole is made wider than the widths of rotor slots at and after the second slot counted from the magnetic pole side in the direction of internal circumference.

4. The rotor of a rotary electric machine according to claim 1, wherein the rotor wedge of a slot closest to the magnetic pole is made narrower than rotor wedges at and after the second slot counted from the magnetic pole side in the direction of internal circumference.

5. The rotor of a rotary electric machine according to claim 1, wherein the rotor wedge of a slot closest to the magnetic pole is made thinner than rotor wedges at and after the second slot counted from the magnetic pole side in the direction of internal circumference.

6. The rotor of a rotary electric machine according to claim 1, wherein the strength of a material of the rotor wedge of a slot closest to the magnetic pole is made stronger than the strength of materials of rotor wedges at and after the second slot counted from the magnetic pole side in the direction of internal circumference.

7. The rotor of a rotary electric machine according to claim 1, wherein the rotor wedge of a slot closest to the magnetic pole is made of a magnetic material.

8. The rotor of a rotary electric machine according to claim 1, wherein a slot damper made of conductive metal is provided in the inside diameter side of the rotor wedge, in the slots at and after the second slot counted from the magnetic pole side in the direction of internal circumference.

9. The rotor of a rotary electric machine according to claim 1, wherein a subslot is provided as a coolant ventilation path on the slot bottom of at least one of the rotary slots for inserting a winding.

10. The rotor of a rotary electric machine according to claim 9, wherein the subslot is provided on the slot bottoms of at least three rotary slots counted from the magnetic pole side, and when shorter one of the shortest distance between said adjacent rotor slots and the shortest distance between the subslots is assumed to be $Wmin1$ and $Wmin2$ sequentially from the magnetic pole, $Wmin1 \leq Wmin2$.

11. The rotor of a rotary electric machine according to claim 9, wherein the subslot is provided at the slot bottom of at least the rotor slot closest to the magnetic pole side, and a center in the direction of the internal circumference of the subslot of the slot closest to the magnetic pole side is displaced to between the poles from the center of the direction of the internal circumference of the slot.

12. The rotor of a rotary electric machine according to claim 9, wherein the subslot is provided at the slot bottom of at least the rotor slot closest to a magnetic pole, and a corner near the magnetic pole of the subslot closest to the magnetic pole side is chamfered.

13. The rotor of a rotary electric machine according to claim 9, wherein the subslot is provided at the slot bottom of a rotary slot other than a rotary slot closest to the magnetic pole side.

14. The rotor of a rotary electric machine according to claim 13, wherein a cooling path for cooling the field coil is extended in the axial direction, in a rotary slot closest to the magnetic pole side.

15. The rotor of a rotary electric machine according to claim 13, wherein a cooling path extended in the axial direction is provided in the vicinity of the outside diameter of the slot side end portion of the magnetic pole.

16. A rotary electric machine comprising:

a rotor core, which has a magnetic pole, rotor slots for inserting a winding formed in a part other than the magnetic pole part, and teeth formed between the rotor slots, wherein the depth from the open end of a rotor slot closest to the magnetic pole to the bottom of a slot is made less than the depth of slots at and after a second slot counted from the magnetic pole side in the direction of internal circumference, and when a shortest distance between the bottoms of the rotor slots opposed to each other through the magnetic pole is assumed to be a magnetic pole width of the slots, a magnetic pole width $Wp1$ of a slot closest to the magnetic pole is set to 85% or more of a magnetic pole width $Wp2$ of a second slot counted from the magnetic pole side in the direction of internal circumference;

a field coil composed of field coil conductors inserted into the rotor slot;

a rotor wedge which is inserted into the opening of the rotor slot, and holds the field coil; and a stator provided with a predetermined gap to the outer circumference of the rotor core, wherein when a shortest distance between said adjacent rotor slots along a circumferential direction is assumed to be $Wt1$ and $Wt2$ sequentially from the magnetic pole $Wt1 \leq Wt2$.

17. A rotor of a rotary electric machine comprising:

a rotor core, which has a magnetic pole, and rotor slots for inserting a winding formed in a part other than the magnetic pole part, wherein the depth from the open end of a rotor slot closest to the magnetic pole to a slot bottom is made less than the depth of slots at and after a second slot counted from the magnetic pole side in the direction of internal circumference, and when a shortest distance between the bottoms of the rotor slots opposed to each other through the magnetic pole is assumed to be a magnetic pole width of the slots, a magnetic pole width $Wp1$ of a slot closest to the magnetic pole is set to 85% or more of a magnetic pole width $Wp2$ of a second slot counted from the magnetic pole side in the direction of internal circumference;

a field coil composed of field coil conductors inserted into the rotor slot; and a rotor wedge which is inserted into the opening of the rotor slot, and holds the field coil, wherein a subslot is provided as a coolant ventilation path on the slot bottom of at least one of the rotary slots for inserting a winding, wherein the subslot is provided on the slot bottoms of at least three rotary slots counted from the magnetic pole side, and when shorter one of the shortest distance between said adjacent rotor slots and the shortest distance between the subslots is assumed to be $Wmin1$ and $Wmin2$ sequentially from the magnetic pole, $Wmin1 \leq Wmin2$.

18. A rotary electric machine comprising:

a rotor core, which has a magnetic pole, rotor slots for inserting a winding formed in a part other than the magnetic pole part, and teeth formed between the rotor slots, wherein the depth from the open end of a rotor slot closest to the magnetic pole to the bottom of a slot is made less than the depth of slots at and after a second slot counted from the magnetic pole side in the direction of internal circumference, and when a shortest distance between the bottoms of the rotor slots opposed to each other through the magnetic pole is assumed to be a magnetic pole width of the slots, a magnetic pole width $Wp1$ of a slot closest to the magnetic pole is set to 85% or more of a magnetic pole width $Wp2$ of a second slot counted from the magnetic pole side in the direction of internal circumference;

a field coil composed of field coil conductors inserted into the rotor slot;

a rotor wedge which is inserted into the opening of the rotor slot, and holds the field coil; and a stator provided with a predetermined gap to the outer circumference of the rotor core, wherein a subslot is provided as a coolant ventilation path on the slot bottom of at least one of the rotary slots for inserting a winding, wherein the subslot is provided on the slot bottoms of at least three rotary slots counted from the magnetic pole side, and when shorter one of the shortest distance between said adjacent rotor slots and the shortest distance between the subslots is assumed to be Wmin1 and Wmin2 sequentially from the magnetic pole, Wmin1≦Wmin2.

* * * * *